(12) United States Patent
Chao et al.

(10) Patent No.: US 7,639,363 B2
(45) Date of Patent: Dec. 29, 2009

(54) ELECTRO-OPTIC IMAGING FOURIER TRANSFORM SPECTROMETER

(75) Inventors: Tien-Hsin Chao, Valencia, CA (US); Hanying Znod, Arcadia, CA (US)

(73) Assignee: California Institute of Technology, Pasadena, CA (US)

( * ) Notice: Subject to any disclaimer, the term of this patent is extended or adjusted under 35 U.S.C. 154(b) by 34 days.

(21) Appl. No.: 11/518,536

(22) Filed: Sep. 7, 2006

(65) Prior Publication Data
US 2007/0070354 A1    Mar. 29, 2007

Related U.S. Application Data

(60) Provisional application No. 60/715,370, filed on Sep. 7, 2005.

(51) Int. Cl.
G01B 9/02    (2006.01)
(52) U.S. Cl. ..................................... 356/453
(58) Field of Classification Search .............. 356/453, 356/451
See application file for complete search history.

(56) References Cited

U.S. PATENT DOCUMENTS 6,421,131 B1 *   7/2002   Miller ......................... 356/453
6,992,777 B2 *   1/2006   Han et al. ..................... 356/491

* cited by examiner

Primary Examiner—Hwa S Lee (Andrew)
(74) Attorney, Agent, or Firm—Tope-McKay & Associates

(57) ABSTRACT

An Electro-Optic Imaging Fourier Transform Spectrometer (EOIFTS) for Hyperspectral Imaging is described. The EOIFTS includes an input polarizer, an output polarizer, and a plurality of birefringent phase elements. The relative orientations of the polarizers and birefringent phase elements can be changed mechanically or via a controller, using ferroelectric liquid crystals, to substantially measure the spectral Fourier components of light propagating through the EIOFTS. When achromatic switches are used as an integral part of the birefringent phase elements, the EIOFTS becomes suitable for broadband applications, with over 1 micron infrared bandwidth.

10 Claims, 1 Drawing Sheet

ELECTRO-OPTIC IMAGING FOURIER TRANSFORM SPECTROMETER

PRIORITY CLAIM

The present application is a non-provisional utility patent application, claiming the benefit of priority of U.S. Provisional Patent Application No. 60/715,370, filed Sep. 7, 2005, titled, "ELECTRO-OPTIC IMAGING FOURIER TRANSFORM SPECTROMETER (EOIFTS) FOR HYPERSPECTRAL IMAGING."

GOVERNMENT RIGHTS

The invention described herein was made in the performance of work under a NASA contract, and is subject to the provisions of Public Law 96-517 (35 USC 202) in which the Contractor has elected to retain title.

BACKGROUND OF THE INVENTION (1) Field of Invention

The present invention relates to a Spectrometer and more particularly to an electro-optic imaging Fourier transform spectrometer comprising a single optical path in which the intensity of light that exits the spectrometer after the light traverses an input polarizer, a series of adjustable birefringent phase retarders, and an output polarizer is simply related by the total optical phase delay to a portion of the frequency spectrum of the light.

(2) Description of Related Art

Fourier transform spectrometers (FTS) have long been known in the art. FTSs require large changes in total optical path length traversed by a beam of electromagnetic radiation. This has typically been accomplished by scanning Michelson interferometers in which one mirror of the interferometer is physically moved to change its length. Such an interferometer design has the advantage that a large, continuous band of frequencies can be resolved by scanning large distances with the great precision usually enjoyed by modern mechanical devices. However, because of the necessity to move large distances, such interferometers tend to be very large, heavy, slow, have many moving parts, require ultra-precise alignment, and consume relatively large amounts of power to operate.

The motivation for the present invention was partially born from a need to take a FTS into orbit around Earth and every problem mentioned in the above paragraph becomes exacerbated in the context of space missions: being large and heavy significantly increases the cost of launching the FTS into orbit; as the satellites typically orbit through the atmosphere at speeds upwards of 17,000 miles per hour, they can pass through relevant samples very quickly, requiring faster-than-normal operational scanning speeds; many moving parts makes mechanical failure more likely during the violent launch period; once launched, the satellites must function on their own without human intervention, making any alignment tolerances problematic as they cannot ever be realigned; and lastly, large power consumption means that, for a given mission lifetime, either more fuel must be taken along with the satellite or larger solar panels must be used in orbit, both of which drastically increase the cost of a space mission.

In addition to the shortcomings of modern FTSs with regard to space missions, the same shortcomings of commercial FTSs and wave-meters, namely that they are expensive, large, and slow, are notable in the modern-day research laboratory.

Thus, a continuing need exists for an improved FTS that is more compact, lighter-weight, faster, has fewer moving parts, is less sensitive to alignment, and consumes less power than the FTSs that are currently available.

SUMMARY OF INVENTION

The present invention relates to a spectrometer. The spectrometer comprises an input polarizer. The input polarizer includes an input polarizer center point, an input polarizer axis through the input polarizer center point, and an input polarizer azimuth vector originating on the input polarizer center point. The input polarizer azimuth vector points substantially perpendicular to the input polarizer axis. The spectrometer also comprises an output polarizer. The output polarizer includes an output polarizer center point, an output polarizer axis through the output polarizer center point, and an output polarizer azimuth vector, which originates on the output polarizer center point and points substantially perpendicular to the output polarizer axis. The output polarizer output polarizer axis is substantially collinear with the input polarizer axis, thus defining a long axis with an input end proximate the input polarizer and an output end proximate the output polarizer. The long axis projects through the input polarizer center point and the output polarizer center point. The long axis further defines an input polarizer orientation between the input polarizer azimuth vector and the long axis and an output polarizer orientation between the output polarizer azimuth vector and the long axis.

The spectrometer also comprises an input quarter wave switch and an output half wave switch. The input quarter wave switch is positioned between the input polarizer and the plurality of birefringent phase elements, the input quarter wave switch having a center point and an input quarter wave switch azimuth vector originating on the input quarter wave switch center point and pointing substantially perpendicular to the long axis, thus defining an input quarter wave switch orientation between the input quarter wave switch azimuth vector and the long axis. The output half wave switch is positioned between the output polarizer and the plurality of birefringent phase elements, the output half wave switch having a center point and an output half wave switch azimuth vector originating on the output half wave switch center point and pointing substantially perpendicular to the long axis, thus defining an output half wave switch orientation between the output half wave switch azimuth vector and the long axis.

The spectrometer also comprises a plurality of birefringent phase elements residing between the input polarizer and the output polarizer. The birefringent phase elements include a birefringent phase element center point and a birefringent phase element azimuth vector originating on the birefringent phase element center point. The birefringent phase element azimuth vector point substantially perpendicular to the long axis, thus defining a birefringent phase element orientation between the birefringent phase element azimuth vector and the long axis. An orientation of at least one of the elements is changed, the element being selected from the group consisting of the input polarizer quarter wave switch orientation, the output polarizer half wave switch orientation, and any of the birefringent phase element orientations, allowing the user to substantially reproduce Fourier components of frequency spectra of light passing fully through spectrometer substantially parallel to the long axis.

In another aspect, the spectrometer further comprises a controller. The controller is operably connected with at least one element selected from the group consisting of the input polarizer quarter wave switch, the output polarizer half wave switch, and any of the birefringent phase elements. The controller can change the orientation of any element to which it is operably connected.

In yet another aspect, each birefringent phase element comprises an achromatic switch and a birefringent phase retarder. The birefringent phase retarder is substantially adjacent to the achromatic switch. The birefringent phase element is oriented such that the achromatic switch is nearer the output end of the long axis than the birefringent phase retarder.

In yet another aspect, the birefringent phase element adjacent to the input polarizer has an achromatic switch with phase retardance of substantially 90 degrees and all other birefringent phase elements have achromatic switches with phase retardances of substantially 180 degrees.

In yet another aspect, there are an integer N of birefringent phase elements, and for every integer, j, from 0 to N, there is exactly one birefringent phase element with an achromatic switch with phase retardance of substantially 180 degrees and a birefringent phase retarder with phase retardance of substantially $2^j$ times 360 degrees. Thus the orientations of the N birefringent phase elements can be changed to create a substantially binary set of phase delay values.

Finally, as can be appreciated by one in the art, the present invention also comprises a method for forming and using the spectrometer described herein.

BRIEF DESCRIPTION OF THE DRAWINGS

The objects, features and advantages of the present invention will be apparent from the following detailed descriptions of the various aspects of the invention in conjunction with reference to the following drawings, where:

The objects, features and advantages of the present invention will be apparent from the following detailed descriptions of the various aspects of the invention in conjunction with reference to the following drawings, where:

FIG. 1 also contains an exploded view of one of the birefringent phase elements, showing that the birefringent phase element comprises a birefringent phase retarder and an achromatic switch.

DETAILED DESCRIPTION

Figure 1:
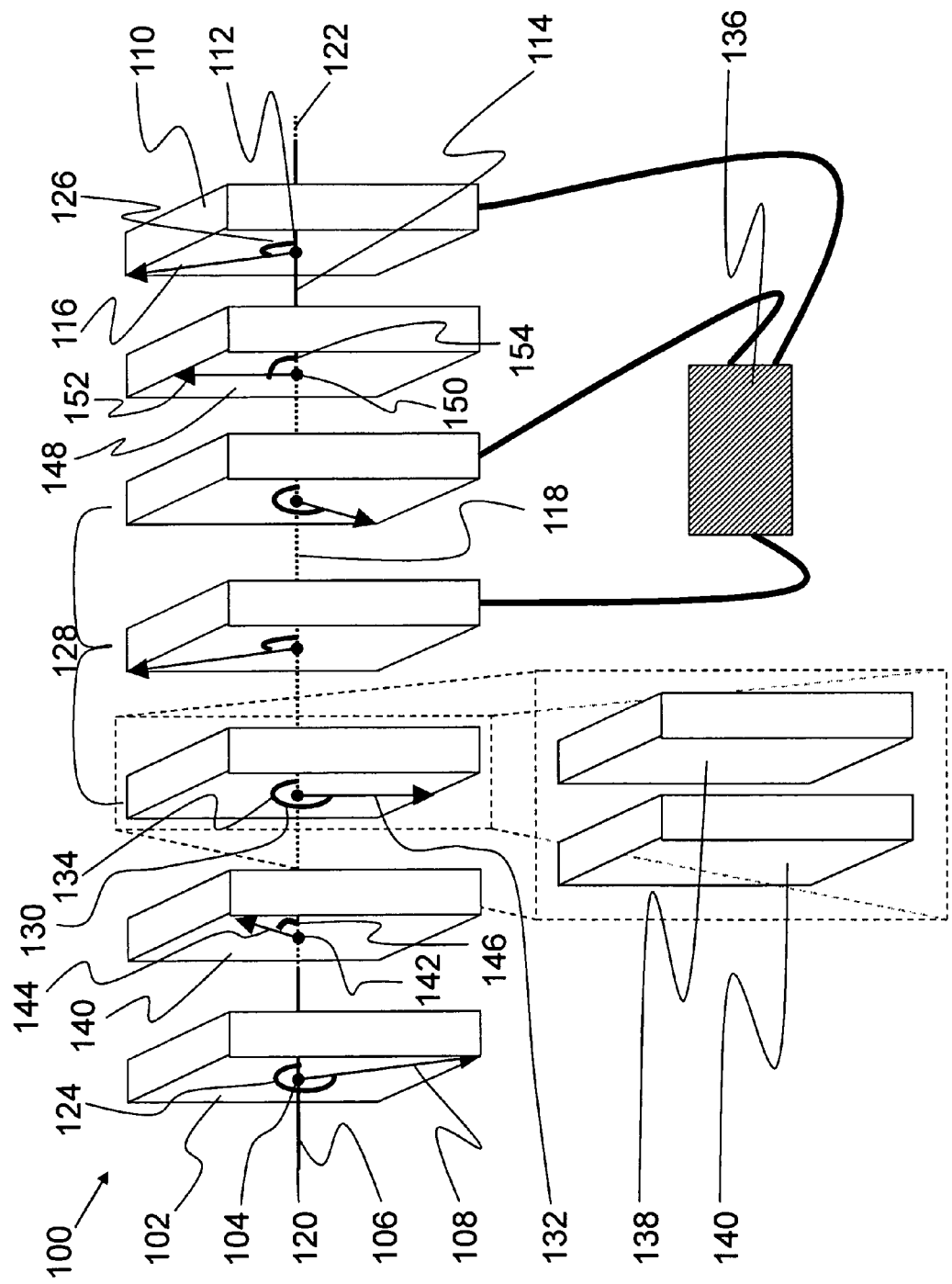
FIG. 1 is a block diagram, illustrating an Electro-optic Imaging Fourier Transform Spectrometer with three birefringent phase elements and a controller.

The present invention relates to spectrometer and more particularly to an electro-optic imaging Fourier transform spectrometer for hyperspectral imaging. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Before describing the invention in detail, first a glossary of terms used in the description and claims is provided. Next, a description of various principal aspects of the present invention is provided. Subsequently, an introduction provides the reader with a general understanding of the present invention. Finally, details of the present invention are provided to give an understanding of the specific aspects.

(1) Glossary

The following glossary is intended to provide the reader with a general understanding of the intended meaning of the terms, but is not intended to convey the entire scope of each term. Rather, the glossary is intended to supplement the rest of the specification in order to more accurately explain the terms used.

Achromatic switch—The term "achromatic switch" as used with respect to this invention refers to a series of optical components with two special orientations that transform the polarization of light propagating through the material in some set of special directions, the degree of polarization transformation being substantially independent of the wavelength of light over a range determined by the user and the material parameters. As it is most commonly used by those in the art of the present invention, the achromatic switch comprises at least 2 passive birefringent films or crystals on either side of a twisted nematic or ferroelectric liquid crystal.

Birefringent—The term "birefringent" as used with respect to this invention refers to a material whose index of refraction depends on polarization. In particular, the index of refraction is different for two, independent, linear polarizations orthogonal to the propagation direction.

Birefringent phase retarder—The term "birefringent phase retarder" as used with respect to this invention refers to a birefringent material so oriented that light propagating through the material in some set of special directions and orientations has the phases of its orthogonal polarization components changed with respect to one another by some desired amount.

Frequency Spectra—The term "frequency spectrum" or "frequency spectra" (plural) as used with respect to this invention refers to the function that describes the relative energy density per unit frequency or per unit wavelength in a beam of light.

Polarizer—The term "polarizer" as used with respect to this invention refers to a material that attenuates orthogonal linear polarizations of light by dramatically different amounts, so that light that interacts with the material becomes substantially polarized in some desired direction after the interaction.

(2) Description

As shown in FIG. 1, the spectrometer 100 comprises an input polarizer 102, including an input polarizer center point 104, an input polarizer axis 106 through the input polarizer center point 104, and an input polarizer azimuth vector 108 originating on the input polarizer center point 104 and pointing substantially perpendicular to the input polarizer axis 106. The spectrometer 100 also includes an output polarizer 110, including an output polarizer center point 112, an output polarizer axis 114 through the output polarizer center point 112, and an output 110 polarizer azimuth 116 vector originating on the output polarizer center point 112 and pointing substantially perpendicular to the output polarizer axis 114. The output polarizer axis 114 is substantially collinear with the input polarizer axis 106, thus defining a long axis 118 with an input end 120 proximate the input polarizer 102 and an output end 122 proximate the output polarizer 110. The long axis 118 projects through the input polarizer center point 104 and the output polarizer center point 112. The long axis 118 further defines an input polarizer orientation 124 between the input polarizer azimuth vector 108 and the long axis 118 and an output polarizer orientation 126 between the output polarizer azimuth vector 116 and the long axis 118. The spectrometer 100 further comprises a plurality of birefringent phase elements 128 residing between the input polarizer 102 and the output polarizer 110. Each of the birefringement phase elements 128 include a birefringent phase element center point 130 and a birefringent phase element azimuth vector 132 originating on the birefringent phase element center point 130 and pointing substantially perpendicular to the long axis 118, thus defining a birefringent phase element orientation 134 between the birefringent phase element azimuth vector 132 and the long axis 118.

An input achromatic quarter wave switch 140 is positioned between the input polarizer 102 and the plurality of birefringent phase elements 128, the input quarter wave switch 140 having a center point 142 and an input quarter wave switch azimuth vector 144 originating on the input quarter wave switch 102 center point and pointing substantially perpendicular to the long axis 118, thus defining an input quarter wave switch orientation 146 between the input quarter wave switch azimuth vector 144 and the long axis 118. The input quarter wave switch is variable in four steps: $0$, $\pi$, $\pi/2$, and $-\pi/2$.

An output achromatic half wave switch 148 positioned between the output polarizer 110 and the plurality of birefringent phase elements 128, the output half wave switch 148 having a center point 150 and an output half wave switch azimuth vector 152 originating on the output half wave switch center point 150 and pointing substantially perpendicular to the long axis 118, thus defining an output half wave switch orientation 154 between the output half wave switch azimuth vector 152 and the long axis 118. The output half wave switch is variable in two steps: $\pi/2$, and $-\pi/2$.

The spectrometer 100 is capable of changing a variety of orientations, non-limiting examples of which include the input polarizer quarter wave switch orientation 144, the output polarizer half wave switch orientation 152, and any of the birefringent phase element orientations 134 to substantially reproduce Fourier components of frequency spectra of light passing fully through the spectrometer 100 substantially parallel to the long axis 118.

FIG. 1 also shows a controller 136 operably connected with at least one element selected from the group consisting of the input polarizer quarter wave switch 140, the output polarizer half wave switch 148, and any of the birefringent phase elements 128. The controller 136 can change the orientation of any element to which it is operably connected.

FIG. 1 also shows, in an exploded view demarcated by the dashed box, that, in a particular mode, the birefringent phase elements 128 comprise a birefringent phase retarder 140 and an achromatic switch 138. The birefringent phase retarder 140 substantially adjacent to the achromatic switch 138. Additionally, the birefringent phase element 128 is oriented such that the achromatic switch 138 is nearer the output end 122 of the long axis 118 than the birefringent phase retarder 140.

National Aeronautics and Space Administration's (NASA's) Jet Propulsion Laboratory is developing an innovative, compact, low mass, Electro-Optic Imaging Fourier Spectrometer (EOIFTS) for hyperspectral imaging applications. NASA headquarters are located at 300 East Street, Southwest, Washington, D.C. The spectral region of this spectrometer will be 1000 to 4000 wave-numbers to allow high-resolution, high-speed hyperspectral imaging applications. Due to the use of a combination of birefringent phase retarders and multiple achromatic phase switches to achieve phase delay, this spectrometer is capable of hyperspectral measurements similar to that of the conventional Fourier transform spectrometer but without any moving parts. Major NASA applications are the remote sensing of the measurement of a large number of different atmospheric gases simultaneously in the same airmass.

The reported new technology will result in the development of a high-resolution spectrometer without any moving parts that will provide a substantial improvement in reliability, mission duration, and performance to the next-generation Earth orbiting Fourier transform spectrometers that have been extensively deployed in orbit for atmospheric monitoring. It also promises to be much smaller in size and mass.

Traditional Fourier transform spectrometers possess two major advantages over grating, prism, and circular variable filter (CVF) spectrometers. One is the time-multiplexing effect. The Michelson interferometer's single detector views all the wavelengths (within the instrument passband) simultaneously throughout the entire measurement. This effectively lets the detector collect data on each wavelength for the entire measurement time, measuring more photons and therefore, results in higher signal-to-noise ratios, this type of operations being best for situations where the source is stable. The other is the throughput advantages, since the FTS does not need spatial filters (e.g. a slit) in the optical light path.

However, traditional Fourier transform spectrometers, used in space flight missions, obtain their optical delay by physically translating one or more optical components. The so-called translation mechanism usually dominates the risk, cost, power consumption, and performance of such instruments because: 1) over the course of a 5-year-period, tens of millions of strokes will be required, making wear or fatigue a serious risk; 2) the moving optical element(s) cannot be rigidly held, making it sensitive to vibration and requiring that it be "caged" during launch to prevent damage, adding risk (failure of the caging mechanism to open); and 3) accelerating and decelerating the optical elements that can torque the spacecraft, making it difficult to maintain accurate pointing.

The solution to the above problems is to construct a high-resolution Fourier transform spectrometer that, instead of using a mechanical Michelson interferometer, consists of cascaded birefringent crystals or films for phase delay and achromatic phase switches to achieve a solid-state programmable phase delay without any moving parts. This will represent a substantial improvement in reliability, mission duration, and performance. It also promises to be much smaller in size and mass.

The EOIFTS is built upon a sequence of the time-delay unit. The EOIFTS consists of an input polarizer, a quarter wave achromatic switch, a series of N liquid crystal based electro-optic switches interlaced with a series of passive birefringent phase retarders. The basic building block of the system is the unit consisting of a single achromatic half-wave switch between two neighboring passive wave retarders. The principle is that one can select between the sum or difference in total retardation of the wave passing through these two passive wave retarders by rotating the in-between achromatic half-wave switch. With parallel passive retarders oriented at 45 degrees to the input polarization, an achromatic half-wave retarder oriented at zero degrees gives the difference in retardation, while an orientation of 45 degrees gives the sum. By stacking multiple passive retarders interlaced with achromatic half-wave switches, a long time delay can be achieved that is essential for achieving a high-resolution spectrometer. By using a geometric relationship of passive retarder thicknesses (i.e. 1 wavelength, 2 wavelengths, 4 wavelengths, etc.), an arithmetic progression in time delay steps is achieved.

The output of the spectrometer is a periodic representation of the original bandlimited spectrum of input light. This periodicity results from the fact that the spectrometer samples the autocorrelation of the light's electric field to recover the spectrum. Due to the limited number of time-samples, the output spectrum is more accurately described as a smoothed periodic representation of the input. Knowing this, one can consider the input as a single cycle of the resulting periodic output spectrum.

The total power on the detector is the integral of the input spectrum modulated by the transmission function of the EOIFTS. The achromatic quarter wave switch and the last achromatic half wave switch can separate four measurements of the input spectrum, three of which are independent and necessary to fully reconstruct the input spectrum.

The achromatic switches are well-known the art, but, as a concrete example, achromatic half-wave switches in one embodiment of the present invention were constructed by sandwiching a ferroelectric liquid crystal with 90 degree polarization rotation at 1120 nanometers wavelength, the input director oriented at 74 degrees, between two retardation films, each film possessing a full-wave retardance at 600 nanometers wavelength. These achromatic half-wave switches were substantially a half wave in a 1.5 micron band centered near 1.75 microns wavelength.

What is claimed is:

1. A spectrometer comprising:
   an input polarizer, including an input polarizer center point, an input polarizer axis through the input polarizer center point, and an input polarizer azimuth vector originating on the input polarizer center point and pointing substantially perpendicular to the input polarizer axis;
   an output polarizer, including an output polarizer center point, an output polarizer axis through the output polarizer center point, and an output polarizer azimuth vector originating on the output polarizer center point and pointing substantially perpendicular to the output polarizer axis, the output polarizer axis being substantially collinear with the input polarizer axis, thus defining a long axis with an input end proximate the input polarizer and an output end proximate the output polarizer, the long axis projecting through the input polarizer center point and the output polarizer center point, the long axis further defining an input polarizer orientation between the input polarizer azimuth vector and the long axis and an output polarizer orientation between the output polarizer azimuth vector and the long axis;
   a plurality of birefringent phase elements residing between the input polarizer and the output polarizer, including a birefringent phase element center point and a birefringent phase element azimuth vector originating on the birefringent phase element center point and pointing substantially perpendicular to the long axis, thus defining a birefringent phase element orientation between the birefringent phase element azimuth vector and the long axis;
   an input quarter wave switch positioned between the input polarizer and the plurality of birefringent phase elements, the input quarter wave switch having a center point and an input quarter wave switch azimuth vector originating on the input quarter wave switch center point and pointing substantially perpendicular to the long axis, thus defining an input quarter wave switch orientation between the input quarter wave switch azimuth vector and the lone axis; and
   an output half wave switch positioned between the output polarizer and the plurality of birefringent phase elements, the output half wave switch having a center point and an output half wave switch azimuth vector originating on the output half wave switch center point and pointing substantially perpendicular to the long axis, thus defining an output half wave switch orientation between the output half wave switch azimuth vector and the long axis,
   where the orientation of at least one element is changed, the at least one element being selected from a group consisting of the input quarter wave switch orientation, the output half wave switch orientation, and any of the birefringent phase element orientations to substantially reproduce Fourier components of frequency spectra of light passing fully through the spectrometer substantially parallel to the long axis.

2. A spectrometer as set forth in claim 1 further comprising:
   a controller operably connected with at least one element selected from the group consisting of the input quarter wave switch, the output half wave switch, and any of the birefringent phase elements, whereby the controller can change the orientation of any element to which it is operably connected.

3. A spectrometer as set forth in claim 2, wherein each birefringent phase element comprises:
   an achromatic switch;
   a birefringent phase retarder, the birefringent phase retarder substantially adjacent to the achromatic switch, the birefringent phase element oriented such that the achromatic switch is nearer the output end of the long axis than the birefringent phase retarder.

4. A spectrometer as set forth in claim 3, where the birefringent phase element adjacent to the input polarizer has an achromatic switch with phase retardance of substantially 90 degrees, and all other birefringent phase elements have achromatic switches with phase retardances of substantially 180 degrees.

5. A spectrometer as set forth in claim 4, wherein there are an integer N of birefringent phase elements, and for every integer, j, from 0 to N, there is exactly one birefringent phase element with an achromatic switch with phase retardance of substantially 180 degrees and a birefringent phase retarder with phase retardance of substantially 2j (two to the power j) times 360 degrees, whereby the orientations of the N birefringent phase elements can be changed to create a substantially binary set of phase delay values.

6. A method of forming a spectrometer comprising acts of:
arranging and aligning an input polarizer, an output polarizer, an input quarter wave switch, an output half wave switch, and a plurality of birefringent phase elements along a long axis that projects through the input polarizer, the output polarizer, and the plurality of birefringent phase elements, the birefringent phase elements being arranged such that they reside between the input polarizer and the output polarizer, the input half wave switch being arranged such that it resides between the input polarizer and the plurality of birefringent phase elements, and the output half wave switch being arranged such that it resides between the output polarizer and the plurality of birefringent phase elements;
where at least one element is reoriented, the at least one element being selected from a group consisting of the input quarter wave switch orientation, the output half wave switch orientation, and any of the birefringent phase element orientations to substantially reproduce Fourier components of frequency spectra of light passing fully through the spectrometer substantially parallel to the long axis.

7. A method as set forth in claim 6 further comprising acts of:
forming a controller;
operably connecting the controller with at least one element selected from the group consisting of the input quarter wave switch, the output half wave switch, and any of the birefringent phase elements,
whereby the controller can change the orientation of any element to which it is operably connected.

8. A method as set forth in claim 7, further comprising acts of:
forming each birefringent phase element, each birefringent phase element being formed such that it comprises acts of
assembling an achromatic switch and a birefringent phase retarder, the birefringent phase retarder substantially adjacent to the achromatic switch, the birefringent phase element being nearer the output end of the long axis than the birefringent phase retarder.

9. A method as set forth in claim 8, further comprising acts of:
forming the birefringent phase element adjacent to the input polarizer, the birefringent phase element further being formed such that it has an achromatic switch with phase retardance of substantially 90 degrees, and all other birefringent phase elements further being formed such that they have achromatic switches with phase retardances of substantially 180 degrees.

10. A method as set forth in claim 9, further comprising acts of:
arranging and aligning an integer N of birefringent phase elements such that for every integer, j, from 0 to N, there is exactly one birefringent phase element with an achromatic switch with phase retardance of substantially 180 degrees and a birefringent phase retarder with phase retardance of substantially $2^j$ (two to the power j) times 360 degrees, whereby the orientations of the N birefringent phase elements can be changed to create a substantially binary set of phase delay values.

* * * * *